US009120251B2

(12) United States Patent
Conley et al.

(10) Patent No.: US 9,120,251 B2
(45) Date of Patent: Sep. 1, 2015

(54) COMPOSITE MATERIAL AND METHOD FOR MAKING

(71) Applicant: E I DU PONT DE NEMOURS AND COMPANY, Wilmington, DE (US)

(72) Inventors: Jill A Conley, Midlothian, VA (US); Brian E Foy, Midlothian, VA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 504 days.

(21) Appl. No.: 13/709,477

(22) Filed: Dec. 10, 2012

(65) Prior Publication Data
US 2013/0099428 A1 Apr. 25, 2013

Related U.S. Application Data

(62) Division of application No. 12/640,458, filed on Dec. 17, 2009, now abandoned.

(51) Int. Cl.
B29C 47/00 (2006.01)
B01D 11/04 (2006.01)

(52) U.S. Cl.
CPC .......... B29C 47/0004 (2013.01); B01D 11/043 (2013.01); B29C 47/0011 (2013.01)

(58) Field of Classification Search
CPC .... B29B 9/14; B29C 47/0004; B29C 47/0019
See application file for complete search history.

(56) References Cited

U.S. PATENT DOCUMENTS

| 3,133,138 | A | 5/1964 | Alexander |
| 3,227,793 | A | 1/1966 | Cipriani |
| 3,287,324 | A | 11/1966 | Sweeny |
| 3,414,645 | A | 12/1968 | Morgan |
| 3,767,756 | A | 10/1973 | Blades |
| 3,869,429 | A | 3/1975 | Blades |
| 3,869,430 | A | 3/1975 | Blades |
| 5,667,743 | A | 9/1997 | Tai et al. |
| 5,985,429 | A * | 11/1999 | Plummer et al. ............... 428/220 |
| 6,780,359 | B1 * | 8/2004 | Zehner et al. ................. 264/115 |
| 2003/0018105 | A1 | 1/2003 | Baker |

FOREIGN PATENT DOCUMENTS

| DE | 4016410 | 11/1991 |
| GB | 2104903 | 8/1982 |
| WO | WO 96/34045 | 10/1996 |
| WO | WO 02/22981 | 3/2002 |

OTHER PUBLICATIONS

W. Black et al., Fibre-Forming Aromatic polyamides,Man-Made Fibres—Science and Technology, 1968, p. 297-299, vol. 2, Interscience pulishers.
K. Yam,V.Kalyankai, S.Selke,and C.Lai, Mechanical Properties of Wood Fiber/Recycled HDPE Composites,ANTEC, 1998, 1809-1810.
S.Selke and I.Wichman,Wood Fiber/Polyolefin Composites,Composites Part A, 2004, vol. 35/3 pp. 321-326.
K.L.Yam,B.K. Gogoi,C.C.Lai &S.E. Selke, Composites From Compounding Wood Fibers With Recycled High Density Polyethylene,Polymer Eng. & Sci. 1990, 30:693-699.
PCT International Search Report and Written Opinion for International Application No. PCT/US2011/024750 dated May 26, 2011.

* cited by examiner

Primary Examiner — James Sanders

(57) ABSTRACT

This invention relates to an improved method for making composite structures by dispersing a high tenacity fiber such as aramid in a polymeric matrix to form a premix, combining the premix with a natural fiber such as wood flour and extruding the resulting mixture through a fiber alignment plate and die such that the fibers are substantially aligned in the flow direction of the extrudate.

14 Claims, No Drawings

COMPOSITE MATERIAL AND METHOD FOR MAKING

BACKGROUND OF THE INVENTION

1. Field of the Invention

This invention is directed to composite materials and certain processes for making such materials.

2. Description of the Related Art

It is known that the inclusion of high tenacity fibers such as aramid in a polymeric matrix increases the toughness and strength of the matrix. Attempts have been made to incorporate high tenacity fibers into natural fiber polymeric composites by methods such as adding an aramid-containing resin layer between the layers of a natural fiber laminate structure. However, the problem in the past has always been the ability to uniformly distribute these aramid fibers within the wood plastic composite.

The need still exists for a method of uniformly and intimately distributing the high tenacity fibers within a wood plastic composite matrix.

BRIEF SUMMARY OF THE INVENTION

This invention pertains to a method for making an extruded dimensionally stable and water resistant composite material comprising a discontinuous phase of aligned fibers dispersed within a polymeric continuous phase, the method comprising the steps of:
   (a) combining from about 5 to 50 weight percent of high tenacity fibers having a tenacity of at least 9.0 grams per denier, a modulus of at least 300 grams per denier and a length of from 0.5 to 15 mm with about 50 to 95 weight percent of a polymer;
   (b) mixing the fibers and polymer at a temperature sufficient to melt the polymer thus forming a mixture comprising a discontinuous phase of fibers dispersed in a polymeric continuous phase;
   (c) cooling and forming the resultant mixture into particles or pellets;
   (d) feeding the pellets from step (c) and natural fiber to a mixer in an amount to produce a final composition comprising from about 2 to 15 weight percent of high tenacity fibers, from about 35 to 60 weight percent of natural fiber, and from about 25 to 63 weight percent of polymer based on the total weight of high tenacity fiber, natural fiber and polymer in the final composition;
   (e) applying vacuum to the mixer, heating the mixture to a temperature such that the pellets soften but do not melt and further mixing the high tenacity fiber-natural fiber-polymer composition into a homogeneous mass;
   (f) forming a composite panel by extruding the mixed homogeneous mass through a fiber alignment plate at an extrudate surface temperature not exceeding 260° C. such that at least 70% of the fibers are aligned in the flow direction; and
   (g) cooling and cutting to length the extruded panel.

The invention further pertains to a composite material suitable for use in a structural article comprising;
   a) about 25 to 63 weight percent of a polymer selected from the group consisting of low density polyethylene, high density polyethylene, polypropylene, polyvinylchloride, polycarbonate or mixtures thereof;
   b) about 2 to 15 weight percent of high tenacity fibers having a tenacity of at least 9.0 grams per denier, a modulus of at least 300 grams per denier and a length of from 0.5 to 15 mm; and
   (c) about 35 to 60 weight percent of natural fiber; wherein the natural fiber and high tenacity fiber are dispersed throughout the polymer phase.

DETAILED DESCRIPTION OF THE INVENTION

This invention is directed to a method of combining natural fiber, high tenacity fiber and a polymer into a homogeneous mass and extruding the mass to form a composite structure in which the fibers are substantially aligned in the flow direction of the extrudate.

"Fiber" means a relatively flexible, unit of matter having a high ratio of length to width across its cross-sectional area perpendicular to its length. Typically, fiber length is at least 100 times its diameter or width. Herein, the term "fiber" is used interchangeably with the term "filament". The cross section of the filaments described herein can be any shape, but are typically circular or bean shaped.

Natural Fiber

Preferred natural fibers are those selected from the group consisting of wood cellulose, flax, jute, hemp, sisal, kenaf and mixtures thereof. Although many types and sources of natural fiber are available and can be used within the process of the invention, a preferred fiber is oak or pine, both commercially available from American Wood Fibers. Some of these fibers are also referred to as flour e.g. wood flour. Oak and pine are also presently available as a waste product from numerous manufacturing operations. The use of recycled material requires processes such as segregation, size reduction, screening and other techniques all of which are commonly used in the recycling industry to provide a feedstock of suitable quality. The natural fiber material preferred for use in the method of the invention consists mainly of splinters or slivers having a width or diameter of such a magnitude that allows the natural fiber material to pass through a 20 mesh screen i.e. the fiber has a maximum dimension no greater than about 1.0 mm. Such splinters or slivers are likely to be irregularly shaped with jagged ends and/or edges.

Because of the hygroscopic nature of natural fibers, drying is usually required. For use in the method of the invention, the moisture content of the natural fiber will preferably be less than about 15 percent, and most preferably, less than about 8 percent by weight. Excessive moisture in the natural fiber can impede bonding between the fiber and polymeric material and cause pitting or bubbling in the finished product. A conventional, variable speed, tunnel drier can be used to reduce the moisture content of the natural fibers. It is also believed that microwave technology can be used to flash off moisture if desired.

The natural fiber is present in an amount of from about 35 to 60 weight percent based on the combined weight of natural fiber, high tenacity fiber and polymer. More preferably the natural fiber is present in an amount of from about 40 to 55 weight percent and most preferably present in an amount of from 45 to 50 weight percent.

High Tenacity Fiber

The high tenacity fibers used in this invention come from multi-filament yarns having a tenacity of at least 9 grams per decitex (dtex) and a modulus of at least 300 grams per dtex. The fibers have a length of from 0.5 to 15 mm and more preferably of from 1.0 to 6.5 mm. The high tenacity fiber is present in an amount of from about 2 to 50 weight percent based on the combined weight of natural fiber, high tenacity fiber and polymer. Suitable materials for the filaments include polyamide, polyolefin, polyazole, carbon, glass and mixtures thereof.

When the material is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968.

A preferred aramid is a para-aramid. A preferred para-aramid is poly(p-phenylene terephthalamide) which is called PPD-T. By PPD-T is meant a homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Methods for making para-aramid fibers are generally disclosed in, for example, U.S. Pat. Nos. 3,869,430; 3,869,429; and 3,767,756. Such aromatic polyamide organic fibers and various forms of these fibers are available from E. I. du Pont de Nemours & Company, Wilmington, Del. under the tradename Kevlar® fibers and from Teijin Ltd. of Tokyo, Japan under the tradename Twaron® fibers. Technora® fiber, also available from Teijin is made from copoly(p-phenylene/3,4' diphenyl ester terephthalamide) and may also be considered a para-aramid fiber.

When the fiber is meta-aramid, meta-aramid fiber means meta-oriented synthetic aromatic polyamide polymers. The polymers can include polyamide homopolymers, copolymers, and mixtures thereof which are predominantly aromatic, wherein at least 85% of the amide (—CONH—) linkages are attached directly to two aromatic rings. The rings can be unsubstituted or substituted. The polymers are meta-aramid when the two rings or radicals are meta oriented with respect to each other along the molecular chain. Preferably copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 13 percent by weight of other polymeric material can be blended or bonded with the aramid.

The preferred meta-aramids are poly(meta-phenylene isophthalamide) (MPD-I) and its copolymers. One such meta-aramid fiber is Nomex® aramid fiber available from E. I. du Pont de Nemours and Company of Wilmington, Del., however, meta-aramid fibers are available in various styles under the trademarks Conex®, available from Teijin Ltd. of Tokyo, Japan; Apyeil®, available from Unitika, Ltd. of Osaka, Japan; New Star® Meta-aramid, available from Yantai Spandex Co. Ltd, of Shandong Province, China; and Chinfunex® Aramid 1313 available from Guangdong Charming Chemical Co. Ltd., of Xinhui in Guangdong, China. Meta-aramid fibers are inherently flame resistant and can be spun by dry or wet spinning using any number of processes; however, U.S. Pat. Nos. 3,063,966; 3,227,793; 3,287,324; 3,414,645; and 5,667,743 are illustrative of useful methods for making aramid fibers that could be used.

In some embodiments, the aramid fiber is in the form of floc. Floc means short lengths of fiber, shorter than staple fiber. The length of floc is 0.5 to about 15 mm and a diameter of 4 to 50 micrometers, preferably having a length of 1 to 12 mm and a diameter of 8 to 40 micrometers. Floc that is less than about 0.5 mm in length does not add significantly to the strength of the material in which it is used. Floc or fiber that is more than about 15 mm in length often does not function well because the individual fibers may become entangled and cannot be adequately and uniformly distributed throughout the mixture. Aramid floc is made by cutting aramid fibers into short lengths without significant or any fibrillation, such as those prepared by processes described in U.S. Pat. Nos. 3,063,966, 3,133,138, 3,767,756, and 3,869,430.

When the fiber is polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE) or ultra high molecular weight polyethylene (UHMWPE). The softening point of the high tenacity polyolefin fibers must be higher than the softening point of the polymeric resin used in this invention, preferably by at least 15 degrees C.

In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having yarn tenacities of 30 gpd or greater. If the polybenzazole is a polybenzothioazole, preferably it is poly(p-phenylene benzobisthiazole). If the polybenzazole is a polybenzoxazole, preferably it is poly (p-phenylene benzobisoxazole) and more preferably poly(p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. A preferred poly(pyridobisozazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures.

E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels.

S-Glass is a commercially available magnesia-alumina-silicate glass. This composition is stiffer, stronger, more expensive than E-glass and is commonly used in polymer matrix composites.

Carbon fibers are commercially available and well known to those skilled in the art. In some embodiments, these fibers are about 0.005 to 0.010 mm in diameter and composed mainly of carbon atoms. Carbon fibers can be produced either from polyacrylonitrile (PAN) or from pitch. Pitch based carbon fibers have better heat conductivity characteristics than PAN based fibers and may be appropriate in articles where heat transfer is important.

Polymer

Any suitable polymer may be used. Exemplary materials include, but are not limited to, polyethylene, polypropylene, polyvinylchloride, polycarbonate or mixtures thereof. The polymer is present in an amount of from 25.0 to 64.9 weight percent based on the combined weight of natural fiber, high tenacity fiber and polymer. The polymeric material utilized in the method of the invention preferably comprises a major portion of at least one polyolefin, with polyethylene being particularly preferred. The source and type of polyethylene used in the subject method can vary widely and can include, for example, both high density polyethylene (HDPE) and low density polyethylene (LDPE) materials. In some embodiments, a mixture of HDPE and LDPE is used. In one such embodiment, the polymer comprises greater than 50.0% by weight of LDPE and less than 50.0% by weight of HDPE. In another embodiment, the polymer comprises from 55.0 to 65.0 weight percent of LDPE and from 35.0 to 45.0 weight percent of HDPE.

Numerous sources of virgin or recycled HDPE and LDPE are available. Blends of virgin and recycled polymer may be used as feedstock. The use of recycled material requires processes such as segregation, size reduction, screening and other techniques all of which are commonly used in the recycling industry to provide a feedstock of suitable quality. If not already in granular, flake or pellet form, the material is desirably ground to a maximum particle dimension not exceeding 6.5 mm. When prepared for use in the process of the invention, the moisture content of the polymeric material is preferably less than 6 percent by weight, and most preferably only trace amounts of moisture will remain. The cleaned and dried plastic feed material is preferably classified as to resin type and physical properties (such as melt flow and viscosity ranges), and stored in various holding bins pending further processing.

Although polyethylene is a preferred polymeric material for use in producing the fiber-dispersed composite materials as disclosed herein, other polyolefinic and polymeric materials can also be used in the method of the invention. Other plastics which can be used within the scope of the invention include those which can be processed with extrusion equipment at temperatures that do not adversely affect the natural fiber feed component (such as by charring or the like) so as to avoid producing an unacceptable product. Examples of other suitable plastics are polypropylene, polyvinylchloride and polycarbonate. Mixtures of polymers may also be used.

According to one particular embodiment of the invention, a mixture of polyethylene and polypropylene is used as the polymeric component with the polypropylene constituting from 10 to 15 weight percent of the blend. The percentage of polypropylene used will desirably depend upon the viscosity and melt index of the polyethylene, with less polypropylene being used where a major portion of the polyethylene is high density rather than low density. In general, increasing the amount of polypropylene within the preferred ranges will improve the physical properties of the resultant composite material.

Other Ingredients

Other ingredients may optionally be added to improve either product performance characteristics or to facilitate the production processes. The amount of materials required need to be determined on a case-by-case basis, but typically each ingredient would be less than 10 weight percent of the total composition and more preferably less than 8 weight percent. Examples of these materials are lubricants such as the Glycolube® series of products available from Lonza, Basel, Switzerland; adhesion promoters such as Fusabond® from E.I. Dupont, Wilmington, Del.; wood fillers such as CreaFill from CreaFill Fibers, Chestertown, Md. and talc available from Luzenac America, Inc of Centennial, Colo. available under the tradename Nicron. Materials such as flame retardants, wetting agents, diluents, pigments, dyes, UV absorbers, anti-fungal compounds, coupling agents, toughening particles and viscosity modifiers may also be added to the mix. Preferably these other ingredients are added at the last stage of the mixing process.

Process

One method of manufacturing the composite laminate can consist of three basic process steps. In a first process step, high tenacity fiber and polymer are mixed together to form a premix. In a second process step, the premix is blended with the natural fiber to give a final mix. The third process step involves extrusion of the final fixture of fibers and polymer to form a composite laminate. In a preferred embodiment, the second and third process steps are combined in one continuous process.

The relative percentage of natural fiber to polymer preferred for use in a particular application can vary and will depend upon factors such as the type, size and moisture content of the natural fiber; the type, size and physical properties of the polymeric material being utilized and the physical properties desired in the composite material being produced by the process.

First Process Step

Any suitable mixer can be used to make the high tenacity fiber-polymer premix. Exemplary types of equipment include ribbon mixers, sigma blade mixers and twin screw mixers. In preferred embodiments twin screw mixers are used. The mixers should have heating and cooling capability as well as the ability to vary the speed of turning of the mixing blades. Preferably the ability to apply vacuum should also be available. Desired blade speeds must be determined for the particular mixer. A blade turning speed of about 30 revolutions per minute is acceptable for a sigma blade mixer. Preferably the mixer output is directed into a pelletizing machine.

High tenacity fiber and polymer are added to the mixer in amounts such that, based on the total weight of fiber plus polymer, the amount of fiber comprises from about 5 to 50 weight percent of the premix and the polymer comprises from about 50 to 95 weight percent of the premix. Preferably the fiber comprises 5 to 35 weight percent, and more preferably 5 to 20 weight percent. The mix is heated under vacuum. Mixing continues for so long as is needed to raise the temperature of the mixture to, or above, the melting point of the polymer and thoroughly disperse the high tenacity fibers in the polymer thus forming a mixture comprising a discontinuous phase of fibers dispersed in a polymeric continuous phase. Preferably the mixing temperature is in the range of from 140 to 220 degrees C. and more preferably in the range of from 140 to 190 degrees C. Preferably the mixing temperature should be no more than 20 degrees C. higher than the melting point of the polymer. Once the desired blending has been achieved the mixture is fed into a pelletizing machine which forms the resin into strands, cools the strands and then chops the strands to the desired length. Preferable pellet dimensions are a length of from 3 to 10 mm and a diameter of from 3 to 10 mm. In an optional step, some of the polymer may be held back for addition during the second process step.

Second Process Step

Any suitable mixer can be utilized for this process step. Preferably a screw extruder having at least two inlet ports is used. The mixer must have heating, cooling and vacuum capability as well as the ability to vary the speed of turning of the mixing shaft. A satisfactory extruder is a compounding extruder having a screw with a feed section that is preferably about 305 mm in diameter and from about 305 mm to about 765 mm long. The feed section of the screw preferably tapers at approximately a 45 degree angle to a compression section having a diameter of about 6 inches and a length of from about 765 mm to about 915 mm. In the feed section, the flights of the extruder screw are preferably spaced about 254 mm apart, have a thickness of about 19 mm, and a depth of about 76 mm. In the compression section, the flights of the extruder screw are preferably spaced about 127 mm apart, have a thickness of about 19 mm and a depth of about 25.4 mm. The extruder screw will preferably be rotatable at various speeds, and the preferred rotational speed will depend upon factors such as the desired throughput, the nature and properties of the feed material, the configuration of the extrudate, desired surface properties, and the like.

The premix pellets are fed into the first feeder port of the extruder and the natural fiber into the second feeder port, the second port being closer to the extruder outlet port than the first port. In one embodiment, additional polymer may be added along with the premix pellets at the first feeder port. The quantities of materials added should be such that the resulting mixture comprises from about 2 to 15.0 weight percent of high tenacity fibers, from about 35 to 60 weight percent of natural fiber and about 25 to 63 weight percent of polymer based on the total weight of high tenacity fiber, natural fiber and polymer. Should other ingredients such as those described above be desirable, they should be added with the natural fiber via the second feed port. Preferably vacuum is applied throughout the second mixing step. Mixing continues under heat and vacuum to raise the temperature of the mixture to a temperature range that is greater than the softening point of the polymer but less than the polymer melting point. Under such temperature conditions the natural fibers are thoroughly dispersed into the polymer-high tenacity fiber premix to form a homogenous mass. By homogeneous mass we mean that all the ingredients are intimately mixed and there is no separation or layering of ingredients. Preferably the mixing temperature is in the range of from 130 to 200 degrees C. and more preferably in the range of from 130 to 185 degrees C. The mixed resin may be cooled and decanted into storage containers. At a later stage, the decanted resin may be reheated and fed back into the mixer for extrusion. Preferably the resin is extruded as part of a continuous final mix-extrusion operation.

According to a preferred embodiment of the invention, the compression section of the extruder is jacketed and a cooling medium is circulated through the jacket while maintaining the temperature of the dispersed mixture within the desired range. If the temperature of the dispersed mixture is permitted to drop significantly below the desired range, the material will not flow properly, thereby increasing the mechanical energy required to work the material, and causing irregularities in the resultant extrudate. On the other hand, if the temperature of the dispersed mixture significantly exceeds the maximum temperature of the desired range, the extrudate will not be dimensionally stable, and polymer degradation, charring of the natural fiber or auto-ignition can occur. By way of example, a mixture of about 55 weight percent natural fiber and 45 weight percent LDPE should not be allowed to reach a temperature greater than about 200 degrees C. except for slight exposure of the surface to a higher temperature as discussed below while passing through the die. Similarly, except for the surface temperature while passing through the die, a mixture of about 55 weight percent natural fiber dispersed in about 45 weight percent of plastic in turn comprising about 60 weight percent LDPE and about 40 weight percent HDPE should not be allowed to reach a temperature greater than approximately 205 degrees C.

It has been discovered that whenever natural fiber and polymer comprising a major portion of polyethylene are mixed under the conditions described above, the natural fibers will disperse into and be dispersed within a continuous phase of the polymeric material, and will bond to the polymer.

Third Process Step

A fiber alignment plate is positioned next to the extruder outlet port followed by an extrusion die. The primary functions of the fiber alignment plate are to disrupt any spiraling motion imparted to the material by the extruder screw, to avoid channeling and help balance the flow of material to the die as needed for extruding a desired profile, and to help align the dispersed fibers within the material in the flow direction. Fiber alignment plates useful in the method of the invention preferably comprise a plurality of spaced-apart bars or orifices adapted to substantially align the fibers without plugging off or breaking a substantial portion of the fibers. Preferably at least about 70% of both the high tenacity fibers and the natural fibers are aligned in the flow direction of the extrudate. More preferably at least about 75% of the fibers are aligned and most preferably at least about 80% of the fibers are aligned. After passing through the fiber alignment plate, the mixture is directed through a heated die to form a composite panel. The die is preferably equipped with conventional electrical heating elements such as band or cartridge heaters to maintain the interior walls of the die at an elevated temperature relative to the mixing temperature of the material being extruded. Preferably this temperature difference should be at least 5 degrees C. and more preferably at least 10 degrees C. Increasing the surface temperature of the extrudate will improve its surface finish and reduce the likelihood of tearing as it exits the extruder. A preferred surface temperature range for extrudates comprising LDPE polymer is from 215 to about 235 degrees C. A preferred surface temperature range for extrudates comprising a blend of 60 parts LDPE polymer and 40 weight parts HDPE polymer is from 235 to 260 degrees C.

As an optional feature, an additional surface layer or layers can be coextruded onto the surface of the composite extrudate by use of a conventional crosshead die.

After exiting the extruder die, the extrudate is preferably cooled under controlled conditions to avoid deformation or stress buildup. Cooling should continue until the core temperature of the extrudate is less than 85 degrees C. The cooling time required for a particular extruded profile will depend upon the temperature of the material exiting the die, the geometry of the extrudate, coolant temperature, ambient conditions, and the extent of any external cooling. The coolant may be a liquid or gas. Conventional means of cooling the extrudate include a water spray bath immediately after the die. Preferably the coolant temperature is no greater than 25 degrees C. and more preferably not greater than 15 degrees C.

According to a preferred embodiment of the invention, the extrudate is cut to the desired length and then directed along a variable speed rolling and cooling conveyor.

After cooling, the lengths of product are collected and assembled for storage or shipment, or for further processing such as routing, drilling, milling, finishing, painting, and the like.

Applications for polymeric wood fiber composites include building materials (roof shingles, siding, floor tiles, paneling, moldings, structural components, steps, door and window sills and sashes); house and garden items (planters, flower pots, landscape tiles, decking, outdoor furniture, fencing and playground equipment); farm and ranch items (pasture fencing, posts, barn components); and marine items (decking, bulkheads, pilings).

TEST METHODS

In the following examples, all materials were tested according to ASTM D6109 to obtain modulus of elasticity, modulus of rupture and strain at failure. The density is calculated in the standard way of mass over volume.

EXAMPLES

Examples prepared according to the process or processes of the current invention are indicated by numerical values. Control or Comparative Examples are indicated by letters.

The following raw materials were used in all the Examples described below. Para-aramid fiber having a length of about 1.5 mm was obtained as Kevlar® merge 1F561 from E.I. DuPont de Nemours & Company Wilmington, Del. Commercially available oak flour of a 40 mesh size was obtained from American Wood Fibers, Columbia, Md. In Examples A to C, the high density polyethylene pellets used were Petrothene® LB010000 as supplied from Lyondell Chemicals Co. Houston, Tex. In Examples 1-5, the high density polyethylene pellets used were Petrothene® LM6007-00 also from Lyondell Chemicals Co. It was found that LM grade PE pellets gave better flow characteristics in the premix of Examples 1-5. The grade of talc used was Nicron® 403.

Comparative Examples A-C

Oak wood flour and Kevlar® floc were mixed at ambient temperature for 10 minutes in a 250 pound capacity ribbon mixer to form a premix consistent with the weight percentages detailed in Table 1. The premix of wood flour and aramid was then vacuum-conveyed and fed into an 86 mm twin-screw extruder through a first feeder port and then blended within the extruder with high density polyethylene pellets which were fed through a second feeder port. The mixing temperature was 170 degrees C. and the extruder feed rate was between 60 and 100 kg per minute. The relative quantities of Kevlar® fiber, oak flour and HDPE polymer used in these examples is shown in Table 1. Glycolube WP2200 lubricant, as supplied from Lonza Inc, Fair Lawn, N.J. and talc were also fed to the mix via the second feeder port to give weight percent loadings as shown in Table 1. The resultant blend was extruded at 177 degrees C. through a slot die, the slot having a thickness of 25.4 mm and a width of 127 mm. The extrudate was cooled by chilled water and cut in-line by a saw into lengths of 1525 mm. Samples of the extruded slabs were tested for modulus, rupture strength and strain at break according to ASTM D6109. The density of the slab was also determined. The slabs were cross-sectioned and visual inspection of the cross-sections revealed large balls or clumps of Kevlar® indicating incomplete dispersion of the Kevlar® within the extruded slab. Such incomplete dispersion is a quality defect.

TABLE 1

| Example | % Kevlar | % HDPE | % Oak | % Lubricant | % Talc | Density (kg/m³.) |
| --- | --- | --- | --- | --- | --- | --- |
| A | 1 | 33 | 57 | 3 | 6 | 1170 |
| B | 3 | 33 | 55 | 3 | 6 | 1166 |
| C | 5 | 33 | 53 | 3 | 6 | 1152 |

Examples 1, 2 and 5

For Examples 1, 2 and 5, the weight percentages of Kevlar® and HDPE in the blend as well as the blending temperatures were as listed in Table 2.

TABLE 2

| Example | % Kevlar ® | % HDPE | Mixing Temperature (0° C.) |
| --- | --- | --- | --- |
| 1 | 5 | 95 | 222 |
| 2 | 5 | 95 | 280 |
| 5 | 10 | 90 | 280 |

The HDPE and Kevlar® were mixed together in a K-Tron® feeder with a 60 mm screw. The Kevlar® and HDPE mix was then fed into a 58 mm twin-screw extruder through a common feeder port. The mixing temperature was as stated above, and the extruder feed rate was 4.5 kg per minute. This temperature was sufficient to allow the polymer to melt and thoroughly disperse the Kevlar® fibers within the polymer. The resultant premix was extruded at the mixing temperature through a slot die and was then cooled by water and chopped using a Con-Air pelletizer into 3-4 mm lengths.

The pelletized premix was then fed into a first feeder port of an 86 mm extruder and blended within the extruder with oak flour which was fed through a second feeder port. The percentage amounts of Kevlar® fiber, oak flour and HDPE polymer used in these examples is shown in Table 3. Glycolube WP2200 lubricant and talc were also fed in via the second feeder port to give weight percent loadings as shown in Table 3. The mixing temperature was 170 degrees C. and the extruder feed rate was between 60 and 100 kg per minute. The resultant blend was extruded at 177 degrees C. through a slot die, the slot having a thickness of 25.4 mm and a width of 127 mm. The extrudate was cooled by chilled water and then cut in-line by a saw into lengths of 1525 mm. Samples of the extruded slabs were tested for modulus, rupture strength and strain at break according to ASTM D6109. The density of the slab was also determined. The slabs were cross-sectioned and visual inspection of the cross-sections revealed no conglomerates, balls, or clumps of the Kevlar® fiber indicating complete and uniform dispersion of the Kevlar® within the extruded slab.

Examples 3-4

In Examples 3 and 4, a premix of ninety percent HDPE and ten percent Kevlar® was prepared in a 58 mm twin-screw extruder in a manner identical to Examples 1, 2 and 5, with a constant mixing temperature of 280 degrees C. This premix was then fed, along with additional HPDE pellets, into a first feeder port of an 86 mm extruder and blended within the extruder with oak flour which was fed through a second feeder port. The percentage amounts of Kevlar® fiber, oak flour and HDPE polymer used in these examples is shown in Table 3. Glycolube WP2200 lubricant and talc was also fed in via the second feeder port to give weight percent loadings as shown in Table 3. The mixing temperature was 170 degrees C. and the extruder feed rate was between 60 and 100 kg per minute. The resultant blend was extruded at 177 degrees C. through a slot die, the slot having a thickness of 25.4 mm and a width of 127 mm. The extrudate was cooled by chilled water and then cut in-line by a saw into lengths of 1525 mm. Samples of the extruded slabs were tested for modulus, rupture strength and strain at break according to ASTM D6109. The density of the slab was also determined. The slabs were cross-sectioned and visual inspection of the cross-sections revealed no conglomerates, balls, or clumps of the Kevlar® fiber indicating complete and uniform dispersion of the Kevlar® within the extruded slab.

TABLE 3

| Example | % Kevlar | % HDPE | % Oak | % Lubricant | % Talc | Density (kg per $m^3$.) |
|---|---|---|---|---|---|---|
| 1 | 2 | 38 | 51 | 3 | 6 | 1169 |
| 2 | 2 | 38 | 51 | 3 | 6 | 1173 |
| 3 | 2 | 38 | 51 | 3 | 6 | 1166 |
| 4 | 3 | 37 | 51 | 3 | 6 | 1139 |
| 5 | 4.6 | 41.4 | 45 | 3 | 6 | 1163 |

Evaluation of the mechanical results of Examples 1-5 with those of Comparative Examples A-C showed that the inventive panels exhibit generally higher rupture strength values as presented in Table 4, below

TABLE 4

| Example | % Kevlar | Density (kg/$m^3$) | Modulus *(Kg/$m^2$) | Rupture **(kg/$m^2$) |
|---|---|---|---|---|
| A | 1 | 1,170 | 4.47 | 2.01 |
| B | 3 | 1,166 | 4.29 | 2.01 |
| C | 5 | 1,152 | 3.90 | 2.01 |
| 1 | 2 | 1,169 | 3.35 | 2.21 |
| 2 | 2 | 1,173 | 3.37 | 2.19 |
| 3 | 2 | 1,166 | 3.27 | 2.21 |
| 4 | 3 | 1,139 | 2.92 | 1.74 |
| 5 | 4.6 | 1,163 | 3.28 | 2.36 |

*$\times 10^8$
**$\times 10^6$

We claim:

1. A method for making an extruded composite material comprising a discontinuous phase of aligned fibers dispersed within a polymeric continuous phase, the method comprising, in order, the steps of:
   (a) combining from about 5 to 50 weight percent of high tenacity fibers having a tenacity of at least 9.0 grams per denier, a modulus of at least 300 grams per denier and a length of from 0.5 to 15 mm with about 50 to 95 weight percent of a polymer;
   (b) mixing the fibers and polymer at a temperature sufficient to melt the polymer thus forming a mixture comprising a discontinuous phase of fibers dispersed in a polymeric continuous phase;
   (c) cooling and forming the resultant mixture into particles or pellets;
   (d) feeding the pellets from step (c) and natural fiber to a mixer in an amount to produce a final composition comprising from about 2 to 15 weight percent of high tenacity fibers, from about 35 to 60 weight percent of natural fiber, and from about 25 to 63 weight percent of polymer based on the total weight of high tenacity fiber, natural fiber and polymer in the final composition;
   (e) applying vacuum to the mixer, heating the mixture to a temperature such that the pellets soften but do not melt and further mixing the high tenacity fiber-natural fiber-polymer composition into a homogeneous mass;
   (f) forming a composite panel by extruding the mixed homogeneous mass through a fiber alignment plate at an extrudate surface temperature not exceeding 260° C. such that at least 70% of the fibers are aligned in the flow direction; and
   (g) cooling and cutting to length the extruded panel.

2. The method of claim 1, comprising adding flame retardants, wetting agents, diluents, pigments, dyes, UV absorbers, anti-fungal compounds, fillers, lubricants, coupling agents, toughening particles and viscosity modifiers in step (d).

3. The method of claim 1, wherein the cooling in step (g) is achieved by contacting the extruded panel of step (f) with a coolant where the coolant is at a temperature not exceeding 25° C.

4. The method of claim 1, wherein the polymer is selected from the group consisting of low density polyethylene, high density polyethylene, polypropylene, polyvinylchloride, polycarbonate or mixtures thereof.

5. The method of claim 1, wherein the high tenacity fibers are selected from the group consisting of polyamides, polyolefins, polyazoles, carbon, glass and mixtures thereof.

6. The method of claim 1, wherein the natural fibers are selected from the group consisting of wood cellulose, flax, jute, hemp, sisal, kenaf and mixtures thereof.

7. The method of claim 1, wherein the composite material comprises 40.0 to 55.0 percent natural fiber by weight.

8. The method of claim 1, wherein the composite material comprises 45.0 to 50.0 percent natural fiber by weight.

9. The method of claim 4, wherein the polymer is low density polyethylene.

10. The method of claim 4, wherein the polymer is high density polyethylene.

11. The method of claim 4, wherein the polymer comprises greater than about 50% by weight of low density polyethylene and less than about 50% by weight of high density polyethylene.

12. The method of claim 4, wherein the polymer further comprises from about 10 to 15 weight percent polypropylene.

13. The method of claim 5, wherein the fibers are poly(p-phenylene terephthalamide).

14. The method of claim 11, wherein the polymer comprises from about 55 to 65 weight percent of low density polyethylene and from about 35 to 45 weight percent of high density polyethylene.

* * * * *